G. H. MULLER
H. C. CUSKIE
E. C. McRAE
J. R. FAULKNER
T. H. OSTER
R. T. SEEGER
INVENTORS

BY ATTORNEYS

2,916,282
MOTOR VEHICLE SUSPENSIONS

George H. Muller, Northville, and Herman C. Cuskie, Birmingham, Mich., assignors to Ford Motor Company, Dearborn, Mich., a corporation of Delaware Application September 27, 1956, Serial No. 612,456

3 Claims. (Cl. 267—20)

This invention relates to motor vehicle suspension and, more particularly, to an improvement in the coil spring type of suspension, commonly found between the front road wheels and the frame of a motor vehicle. Reference is hereby made to George H. Muller's copending application Serial Number 570,043 filed March 7, 1956, now Patent No. 2,856,198, granted October 14, 1958.

Coil spring suspensions take many forms and, while this invention is applicable to many of them, only one of the more common types used on front suspensions will be discussed in detail. The type to be discussed has an upper and lower suspension arm, each arm pivoted at one side to the motor vehicle frame and attached at the other to the wheel mounting. The lower suspension arm has a spring seat for a heavy duty coil spring which spring at its upper end conforms to an inner flange of a spring cap. This cap extends downwardly from the top of the spring and has at its lower edge an outwardly extending flange which supports an elastic toroid, which in turn supports an upwardly extending dome assembly which is fixed to the automobile frame, whereby both the spring and toroid are positioned to cause the spring to "float," thereby absorbing many vibrations and jounces, resulting in a less harsh and quieter ride. By locating these toroids at the spring anchor points, the vibrations to the car structure are absorbed.

Figure 1:
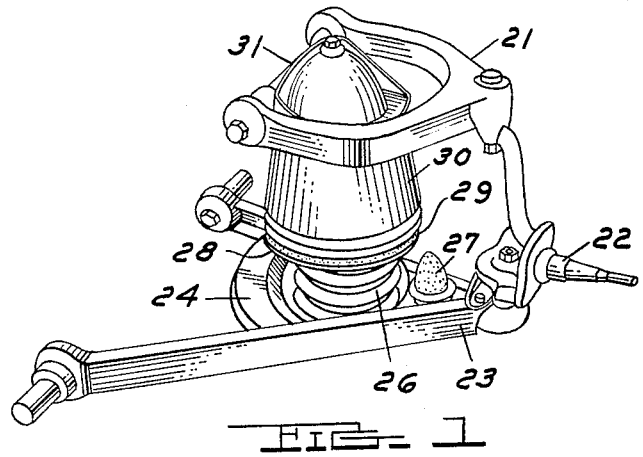
Figure 2:
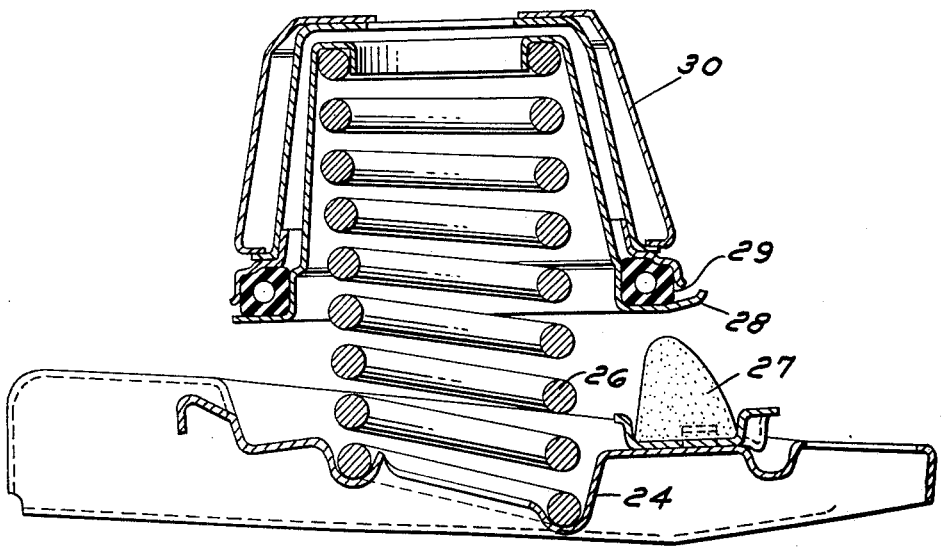

These and other objects will become more apparent when the above-mentioned embodiment will be described in more detail, which description will be aided by drawings in which:

Figure 1 is a pictorial view of the upper and lower suspension arms, shown pivoted at their left side to the vehicle frame and attached at their right sides to a wheel axle mounting, and having between a coil spring which has superimposed a dome assembly which is fixed to the frame; and Figure 2 is a sectional view showing only the coil spring, cap, toroid, dome, and spring seat assembly.

In Figure 1 is shown upper suspension arm 21 which is pivoted at its left side to the conventional frame longitudinal member, not shown, and has a ball-joint suspension to the wheel mount 22. Lower suspension arm 23 is pivoted to the conventional frame cross members, not shown, at its left side and has a ball-joint suspension with wheel mount 22 at the right side. Spring seat 24 is fixed as by welding to lower arm 23 and supports spring 26. Rubber bumper 27 also is fixed to the lower suspension arm and abuts spring cap 28 in its lowermost position. Also pictured is toroid 29 and dome assembly 30 which is fixed at its upper end to cup 31 which is fixed to the conventional longitudinal runner of the vehicle frame. Looking at Figure 2 can more easily be seen the relation between spring seat 24, spring 26, cap 28, toroid 29, and dome assembly 30. The upper and lower suspension arms and cut 31 are not pictured in Figure 2. The inside of toroid 29 may have communication to the atmosphere so that upon a bottoming or flattening action it will readily resume or spring back to its original shape, or any desired pressure may be sealed within.

As can be seen, any axial or lateral movement between assembly 30 and seat 24 will be taken up in part by toroid 29. On axial movements between assembly 30 and seat 24, the spring 26, along with toroid 29, will be compressed and will have a constant which will be a function of the constants of spring 26 and toroid 29. In this way, a relatively stiff spring may be had for spring 26 because toroid 29 will take up many of the vibrational or small jounce movements, thereby providing a smooth but firm ride. When the car is decelerating the lateral loads in the spring become more even with the toroid. The same is true of the loaded wheel in a turn. The spring supports are designed so that the spring stresses caused by misalignment of seats 24 is at a minimum in the full jounce position. With this construction, spring 26 is caused to float, and a non linear spring constant is possible thereby providing a smoother, more desirable ride.

It will be understood that the invention is not to be limited to the exact construction shown and described, but that various changes and modifications may be made without departing from the spirit and scope of the invention, as defined in the appended claims.

What is claimed is:

1. A motor vehicle suspension comprising upper and lower suspension arms pivoted to the vehicle frame and attached to the wheel mounting, said arms being vertically spaced with a coil spring interposed, a cap having an inner and outer flange with said coil spring abutting said inner flange and an elastic tubular toroid abutting said outer flange, a conical dome support assembly secured to said frame and superimposed upon said coil spring and cap and having a lower flange superimposed upon said toroid.

2. An independent wheel suspension for a motor vehicle comprising upper and lower suspension arms pivoted upon the vehicle at one side, and upon the wheel mounting at the other side, a dome assembly interposed between said upper and lower suspension arms and mounted on said vehicle, a coil spring supported at one end on said lower suspension arm and having the opposite end extending axially inwardly into said dome assembly in spaced apart relationship thereto, a spring cap mounted at its upper end on the end of the coil spring extending into said dome assembly, an elastomer toroid mounted on the lower end portion of said spring cap between said spring cap and said dome assembly and supporting said dome, said coil spring providing a floating support for said dome assembly.

3. A motor vehicle suspension comprising upper and lower suspension arms pivoted to the vehicle frame and attached to the wheel mounting, a conical dome member interposed between said upper and lower suspension arms and secured to the vehicle frame, a vertically disposed coil spring having a lower end portion supported on said lower suspension arm and an upper end portion extending axially into said dome member with said spring being spaced apart from said dome member, a conical spring cap having an upper annular flange engaging the upper end portion of the coil spring and having a lower annular flange disposed below said dome member, an elastomer toroid mounted on the lower annular flange of said spring cap and in contact with said dome member and supporting said dome member whereby a floating support for said dome member is obtained.

References Cited in the file of this patent

UNITED STATES PATENTS

| 1,937,511 | Crane | Dec. 5, 1933 |
| 2,314,505 | McIntyre et al. | Mar. 23, 1943 |
| 2,611,627 | Reynolds | Sept. 23, 1952 |
| 2,757,016 | Adloff et al. | July 31, 1956 |

FOREIGN PATENTS

| 179,991 | Austria | Oct. 25, 1954 |